No. 683,787. Patented Oct. 1, 1901.
T. NEWSOME.
PROCESS OF PREPARING OIL AND PRODUCT THEREFROM.
(Application filed May 29, 1901.)
(No Model.)
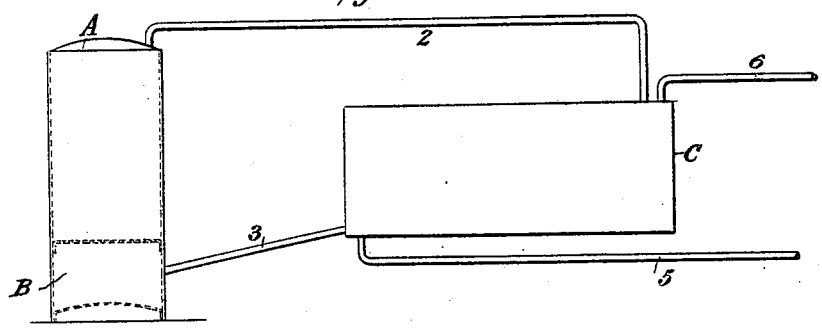
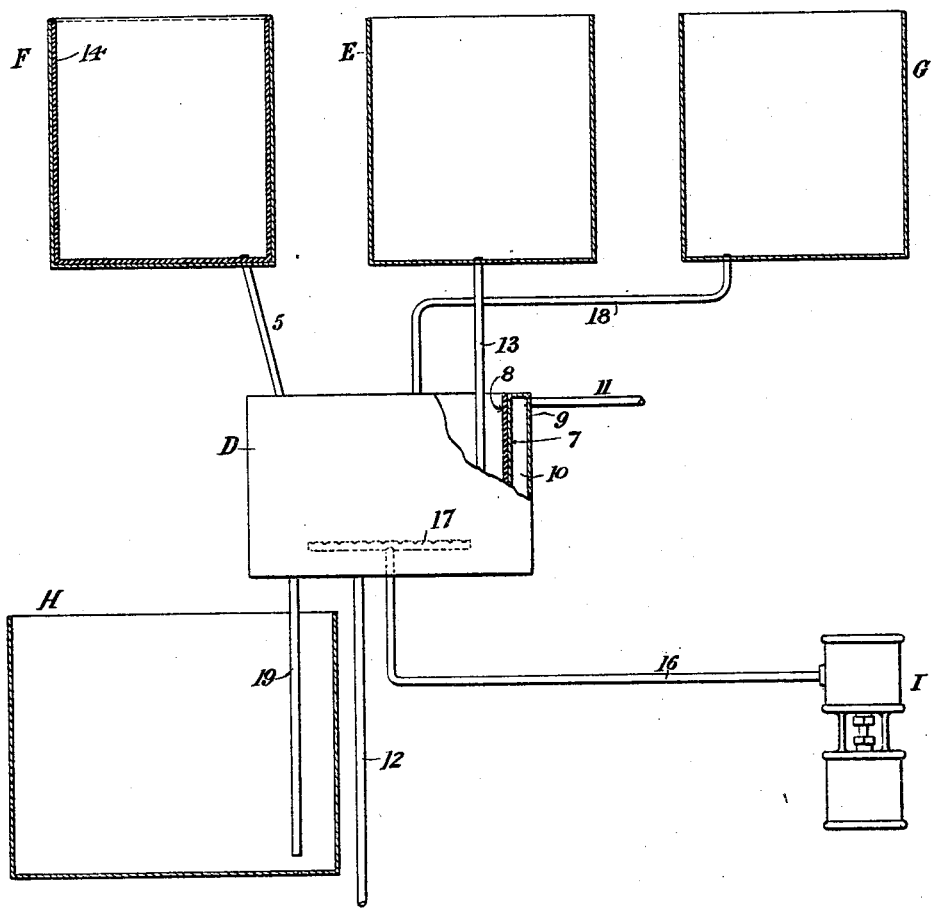
Witnesses:
Raphaël Netter
Benjamin F. French
Thomas Newsome, Inventor
by T. D. Merwin, Atty.
THE NORRIS PETERS CO., PHOTO-LITHO., WASHINGTON, D. C.

UNITED STATES PATENT OFFICE.

THOMAS NEWSOME, OF ROSLINDALE, MASSACHUSETTS, ASSIGNOR, BY MESNE ASSIGNMENTS, TO AMERICAN BY-PRODUCTS COMPANY, OF NEW JERSEY.

PROCESS OF PREPARING OIL AND PRODUCT THEREFROM.

SPECIFICATION forming part of Letters Patent No. 683,787, dated October 1, 1901.

Application filed May 29, 1901. Serial No. 62,355. (No specimens.)

*To all whom it may concern:*

Be it known that I, THOMAS NEWSOME, of Roslindale, county of Suffolk, State of Massachusetts, have invented a new and useful Process of Preparing Oil for Sulfonating and the Product Thereof, of which the following is a specification.

My invention relates to the preparation and manufacture of oils for sulfonating, its object being to produce a cheap and efficient substitute for those commonly employed, such as olive and castor oils, and consisting of the process and product hereinafter described and claimed.

Cotton-seed oil as ordinarily obtained from the kernel is unsuitable for the purpose in view; but I have found that if the oil in cotton-seed hulls as produced by the oil-mills is extracted by means of naphtha or other volatile liquid hydrocarbon, the treatment being extended or continued until the associated waxes and gums are also dissolved and carried off in solution, the combined product of oil, waxes, and gums is entirely suitable for the desired purpose. This is due, it is believed, to the viscosity imparted by the waxes and gums to the oil and the oxidizing effect of the process upon the oil. I have employed in this work, as the best and cheapest solvent of the oil, waxes, and gums, vapor of naphtha, although it is evident that liquid could be used instead of the vapor, but much less efficiently, and also that probably other solvents may be employed in lieu of the hydrocarbon—such as, for example, disulfid of carbon or tetrachlorid of carbon. These latter, however, and all other solvents which I believe could by any possibility be used for the purpose are far too expensive to be practically employed as a substitute for a volatile hydrocarbon.

In the carrying out of my process I employ an apparatus comprising a digester for the hulls in cycle with a generator for producing the vapor. The heated vapor is carried from the generator preferably downward through the material in the digester and back to the generator. In passing through the material the vapor is to a large degree, if not entirely, condensed to a liquid, carrying with it the dissolved oil, waxes, and gums. These latter accumulate in the generator, while the naphtha is again vaporized and carried through the material successively and continuously until the treatment is completed. The oil in the material is dissolved and carried off in the first part of the treatment, which is afterward continued for a considerable period and until the refractory gums and waxes are all dissolved and also carried off. After this part of the process is completed such naphtha as still remains in the hulls is recovered by blowing heated air through the mass and then condensing the vapor carried off by it. The commingled oil and dissolved waxes and gums are drawn off from the receptacle in which they accumulate and may be then disposed of to manufacturers of sulfonated or "turkey-red" oil, or the work of sulfonating may be added to the other steps of the process for the purpose of turning out the sulfonated product. In this case a jacketed lead-lined kettle is preferably employed, in which is placed the oil as extracted, to which the sulfuric acid is gradually added, the whole being agitated, while the temperature of the contents is kept below the point of carbonizing of the oil by means of cold water passing through the jacket. After the desired amount of sulfuric acid has thus been added to the oil brine is preferably added to remove the excess of acid. The contents are then drawn off and allowed to stand for about twenty-four hours to permit the heavier ingredients to settle to the bottom, the oil then being removed or drawn off and washed by any suitable means, after which it is in condition for use.

While any suitable apparatus may be employed for carrying out the described process, I prefer to use appliances such as are illustrated in the accompanying drawings, in which—

Figure 1 shows diagrammatically apparatus for carrying out the hydrocarbon process; and Fig. 2, similarly, apparatus for carrying out the sulfonating process.

In the drawings, A represents the hydrocarbon-generator; B, a settling tank or receptacle beneath the same for receiving the oil and associated dissolved waxes and gums; C, the digester in which the cotton-seed hulls are placed for treatment; 2, a pipe connecting the generator with the digester; 3, a pipe for draining the liquids from the digester into the settling-tank; 5, a pipe from a source of heated-air supply for conducting air through the material to remove the residual hydrocarbon; 6, pipe for conducting hot air and hydrocarbon from the digester to a suitable condensing apparatus (not shown) for recovery of the hydrocarbon.

D represents a kettle or tank for the sulfonating of the oil; E, a storage-tank for the oil; F, a storage-tank for sulfuric acid; G, a brine-storage tank; H, a settling-tank for the oil after sulfonating.

7 is the inner wall of the tank D, protected by a lead lining 8, and is spaced from the outer wall 9 to form about the kettle the chamber 10. The pipe 11 connects the chamber with a source of cold-water supply, and 12 is a waste-pipe. The pipe 13 connects the tank E with the kettle. The sulfuric-acid tank F is protected by a lead lining 14, and a pipe 15 connects it with the kettle D.

I is an air-pump for the purpose of forcing air through the pipe 16 and perforated coil 17 in the bottom of the kettle D to agitate the contents during the process of treatment. After a sufficient amount of acid has been mingled with the oil the supply of acid is cut off and brine is conducted from the tank G by means of the pipe 18 into the kettle D and is thoroughly mingled with the contents by means of the air from the perforated coil 17 to remove the excess of acid. After the operation is completed the oil is drawn off through the pipe 19 into the settling-tank H, and thence removed for washing.

I claim—

1. The process of obtaining a product suitable for sulfonating, which consists in subjecting cotton-seed hulls to the action of a suitable solvent, and continuing the treatment with said solvent until the oil, gums, waxes and resins occurring in the hulls are passed into solution, substantially as described.

2. The process of extracting the oil, waxes and gums from cotton-seed hulls, which consists in subjecting the mass to the action of hydrocarbon vapor, and continuing the treatment until the oil, waxes and gums therein have passed into solution, substantially as described.

3. The process of extracting the oil, waxes and gums from cotton-seed hulls, which consists in subjecting the material in a suitable vessel in cycle with a vapor-generator to the action of hydrocarbon vapor, and continuing the process until such oil, waxes and gums are thoroughly dissolved and carried off in solution, substantially as set forth.

4. The process of subjecting cotton-seed hulls to the action of suitable solvents, and continuing the treatment until the oil, waxes and gums therein are dissolved and carried off, and then subjecting the latter product to the action of sulfuric acid, substantially as set forth.

5. As a new product, the oil from cotton-seed hulls carrying in solution the associated waxes and gums.

6. As a new product the hydrocarbonized oil from cotton-seed hulls carrying in solution the waxes and gums thereof.

7. As a new product the hydrocarbonized and sulfonated oil from cotton-seed hulls carrying the dissolved associated waxes and gums thereof.

Signed at Boston this 20th day of May, 1901.

THOMAS NEWSOME.

Witnesses:
WILLIAM J. W. HEWITT,
GEO. W. P. BABB.